United States Patent
Welk et al.

(10) Patent No.: US 7,540,611 B2
(45) Date of Patent: Jun. 2, 2009

(54) METHOD FOR DESIGNING AND OPTIMIZING AN INDIVIDUAL SPECTACLE GLASS

(75) Inventors: Andrea Welk, Munich (DE); Walter Haimerl, Munich (DE); Gregor Esser, Munich (DE); Peter Baumbach, Munich (DE); Helmut Altheimer, Lauchdorf (DE); Edda Wehner, Emmering (DE)

(73) Assignee: Rodenstock GmbH, Munich (DE)

( * ) Notice: Subject to any disclaimer, the term of this patent is extended or adjusted under 35 U.S.C. 154(b) by 375 days.

(21) Appl. No.: 10/399,904

(22) PCT Filed: Aug. 26, 2002

(86) PCT No.: PCT/DE02/03126

§ 371 (c)(1),
(2), (4) Date: Sep. 8, 2003

(87) PCT Pub. No.: WO03/019269

PCT Pub. Date: Mar. 6, 2003

(65) Prior Publication Data

US 2004/0027679 A1    Feb. 12, 2004

(30) Foreign Application Priority Data

Aug. 24, 2001 (DE) ................ 101 40 656

(51) Int. Cl.
*G02C 7/02* (2006.01)
*G02C 7/04* (2006.01)
*A61B 3/10* (2006.01)

(52) U.S. Cl. .................... 351/177; 351/160 R; 351/159; 351/204

(58) Field of Classification Search ................ 351/177, 351/204, 169, 168, 159, 160, 227
See application file for complete search history.

(56) References Cited

U.S. PATENT DOCUMENTS

| 5,444,503 | A  | * | 8/1995 | Kelch et al. ............ 351/169 |
| 5,926,247 | A  |   | 7/1999 | Kimura |
| 6,709,106 | B2 | * | 3/2004 | Kelch et al. ............ 351/169 |
| 6,830,333 | B2 | * | 12/2004 | Feldman et al. .......... 351/177 |
| 2001/0023413 | A1 | * | 9/2001 | Fukuma et al. ............ 705/27 |
| 2001/0033363 | A1 |   | 10/2001 | Chateau et al. |
| 2004/0032565 | A1 | * | 2/2004 | Yamakaji et al. .......... 351/177 |
| 2004/0246440 | A1 | * | 12/2004 | Andino et al. ............ 351/177 |

FOREIGN PATENT DOCUMENTS

| DE | 42 10 008 A1 | 9/1993 |
| EP | 0 880 046 A1 | 11/1998 |
| EP | 1 116 983 A1 | 7/2001 |
| JP | 10-175149 | 6/1998 |
| WO | 00/55678 | 9/2000 |

OTHER PUBLICATIONS

International Search Report.

* cited by examiner

*Primary Examiner*—Ricky L Mack
*Assistant Examiner*—Brandi N Thomas
(74) *Attorney, Agent, or Firm*—Crowell & Moring LLP

(57) ABSTRACT

A method is described for designing and optimizing an individual spectacle lens. The invention is characterized in that a draft design is made by an ophthalmologist on a video workstation by means of a computer program; the design is communicated to a manufacturer or an optical computing office; and that the manufacturer optimizes an individual spectacle lens on the basis of these stipulations.

14 Claims, No Drawings

METHOD FOR DESIGNING AND OPTIMIZING AN INDIVIDUAL SPECTACLE GLASS

FIELD OF THE INVENTION

The invention relates to a method for designing and optimizing an individual spectacle lens.

STATE OF THE ART

Using conventional ordering systems such as that of the firms of Optische Werke G. Rodenstock of Munich, Carl Zeiss of Aalen, or Essilor of France, an ophthalmologist can stipulate only standard parameters such as prescription parameters, i.e, in particular a spherical power (within a distance portion), an addition power for a bifocal or progressive lens, an astigmatism needed for correction, and also a prismatic power; and in addition, an interpupillary distance, a vertex distance or the like. When these combined with a selected type of lens (e.g. Progressiv life or Impression, as manufactured by the firm of Optische Werke G. Rodenstock), a design of a spectacle lens and particularly of a progressive surface, and possibly also of an individual second surface, has been completely specified.

In this connection the term "design" or "optical design" is understood to mean the kind of spatial distribution of imaging defects on a spectacle lens. Regions of good vision (small imaging defects) are separated from regions of poor vision (large imaging defects) by one or more lines For this, the imaging defects may be defined in various ways; customary definitions being, for example, errors of refraction, magnitude of surface astigmatism, residual astigmatism in a wearing position, i.e. a total remaining astigmatism (vectorial addition of surface astigmatism and astigmatism of skew rays) not serving for correction of an astigmatism of an eye), visus, and/or distortion. In the case of refraction errors and residual astigmatism a value of 0.5 dpt is frequently used as a borderline value between regions of good and poor vision; larger values of up to 1.0 dpt may be used in rare cases. Of course, the various parameters may be also assessed in (weighted) combination. The above recitation of image defects used to distinguish a region of good vision from one of poor vision is, however, not exhaustive.

As a rule, single-vision lenses have a central circular or elliptical region of good vision, containing a centration point. Progressive lenses have at least three regions of good vision, namely a distance region, a near region and an intermediate corridor. For geometrical reasons (Minkwitz Proposition) this intermediate corridor is bounded on both sides by two zones of poor vision.

With classical spectacle lenses relying on a base curve system, the optical design is dependent on the base curve used, and the base curve is in turn dependent on a prescription. A prescription surface is added thereto by suitable calculation; with this a distribution of the imaging defects (or the regions of vision) can no longer be altered in any way. If a design is not acceptable to a customer for any reason, i.e. if incompatibilities arise or if it is unsuitable for a particular viewing requirement, then an ophthalmologist can only resort to a different product.

During recent years there has been a trend towards individualization in the optician industry.

As a first big step towards individual spectacle lenses, a prescription surface having an atoroidal shape was optimized according to the prescription. An example of this is the "Multigressiv" spectacle lens of the firm of Optische Werke G. Rodenstock.

As a second step, the prescription surface was integrated into a progressive surface. The resulting surface is a so-called progressive atoroidal surface. An example of this is the product "Impression ILT" of the firm of Optische Werke G. Rodenstock. Reference is expressly made to all the above-named known spectacle lenses of the firm of Optische Werke G. Rodenstock for an explanation of all terms not described here in greater detail, and in particular, of the individualization data.

With the known "Impression ILT" spectacle lens account is taken not only of a prescription, but also of the entire pair of individual spectacles and its individual fitting in front of the eyes of a spectacles wearer. For this, data concerning the vertex distance, the interpupillary distance, the pantoscopic angle and the angle of tilt of a lens-mounting rim, amongst others, must be measured by an ophthalmologist and communicated to the manufacturer who performs a computation of the individual spectacle lenses.

With "Impression ILT" spectacle lenses an endeavor is made to maintain a design, regarded as being optimal for optical powers around zero, throughout the entire spectrum of power, i.e. also for powers of −10 dpt to +10 dpt in the distance portion.

Even with known individually optimized spectacle lenses, an ophthalmologist cannot directly affect the design. He can merely avoid an impairment of imaging quality by means of careful work.

Thus it has hitherto been impossible for an ophthalmologist to deliberately affect the design of a spectacle lens.

The next step on the road to individualization is thus the design itself. So-called design classes are already known from patent literature, for example spectacle lenses for motorists, outdoor activities, golfers, tennis players etc. However, here too, in the end the design is always the result of a development made by the optical industry. Stated differently, design is still governed by the specifications of the optical industry.

DESCRIPTION OF THE INVENTION

If it is desired to dispense with designs that have been firmly established by the specifications of the optical industry, it becomes necessary for an ophthalmologist or a customer in an ophthalmologist's shop to be able to actively plan a design which he regards as being optimal for a particularly desired or most frequently used application. For this, an ophthalmologist will need a facility by means of which he can create a design which appears to him or to his customer as being suitable.

The object of the invention is to provide a method for designing and optimizing an individual spectacle lens.

This object is achieved by the invention as described and claimed hereinafter.

In accordance with the invention, a draft design is made by an ophthalmologist or a customer who establishes on a video workstation by means of a computer program how the zones of good vision are to be distributed on the spectacle lens for the desired individual spectacle lens. Of course, the size of the individual zones such as, for example, the distance vision zone, the near vision zone and the progression zone can be established only within the limits of what is technically possible. Nevertheless, this makes possible a range of variation which is large in comparison with standard designs, and extends far beyond the designs established as being standard.

For example, a golf player can stipulate that he wishes to have a comparatively wide field of view for performing a stroke— at his own individual distance from the ball to be hit—, a comparatively short progression zone, and a large distance zone for observing the golf ball following the stroke. This individually established design is then communicated to a manufacturer or an optical computation office; and on the basis of the stipulations a spectacle lens that is completely individual even with respect to the design data is computed (optimized) and fabricated.

Preferably the ophthalmologist or the customer will plan the design on the display unit of a computer in a few steps with the aid of a graphic interface. What is fully decisive for the tool to be accepted by the ophthalmologist is a simple but effective user guide which does not confuse the user. In the simplest case he may be able to compile the steps necessary for the designing operation, which will be described in the following, from so-called templates according to a modular system. In more complex cases, an experienced user can also intervene in the design operation in a very detailed manner. At first, the ophthalmologist will enters the usual measured parameters (prescription and all individual spectacles data) via numerical input panels and stipulates the type of lens in question, for example whether it is a single vision or multi-focal or progressive lens. With an indicating instrument (mouse) and/or numerical input panels he then stipulates an object distance for respective viewing regions. This object distance, in particular, may be a function of two independent variables, namely a horizontal and a vertical position coordinate. The object distance may also be a constant function, e.g. 40 cm for pure reading spectacles, or infinity for distant vision spectacles. The object distance may also be a variable function, e.g. having values between infinity in the upper region and 40 cm in the lower region of the lens, which would be typical for standard progressive lenses. Standard values of this kind may be preset in a selection menu of the tool. For example, the object distance may be laid down for distant vision and near vision at reference points 0 dpt (for distant vision) and −2.5 dpt (for near vision). The ophthalmologist may select the object distance from a set of suggested functions, however without being committed in any way by these stipulations. This is because there are yet infinitely more other possibilities, intermediate between these standard object distance functions, of stipulating a variation of the object distance which appears to be optimal for the individual requirements of the customer. The ophthalmologist may vary the parameters of the desired function in such manner that they are optimally suited to the vision requirements of the customer.

For this it is possible, in particular, to provide a progressive spectacle lens or a multifocal lens with not only the two regions for distant vision and near vision, but also with three or more regions for different distances, for example for intermediate distances as may be required, for example with so-called pilot's spectacles.

Furthermore, it is possible not only to lay down an individual object distance for the near region or an additionally provided intermediate region, but to preset the object distance also as a function of horizontal and vertical coordinates in a wearing position. This may be expedient, for example, for writing-desk spectacles or spectacles for video workstations.

In the case of multifocal or progressive spectacles, an accommodation of which the customer is still capable is computed in a standard manner from the prescription and the object distance function, or determined and input by the ophthalmologist.

In the next step an ophthalmologist will allocate by means of an indicating instrument, for example a mouse, and/or via numerical input panels, regions of good vision on the lens in a suitable manner, as may be defined, for example, by a highly achievable visus, and he will distribute the imaging defects such as, for example, refraction errors and astigmatism, and possibly also higher terms of the imaging defects such as gradients and the like) For this, the borderline curves separating the zones of good vision from the zones of poor vision play a major part. These curves may be represented in known manner by splines, and their shapes may be changed by shifting so-called control points. The ophthalmologist operating the tool may "play" with the positions of the control points until he is satisfied with the shapes of the borderline curves, and until the zones of good vision are located in those regions of the lens which the customer needs for his individual vision requirements. Such borderline curves can be input for all image defects. It is expedient to display at least the graphics for (total) astigmatism, refraction errors (in particular in a wearing position), and the visus simultaneously and next to each other on the visual display unit.

Here too, the method may be simplified by means of a standardized procedure. Thus, for example, a selection of the regions of good vision may be performed by establishing the mainly used regions and weighting these appropriately, e.g. using the weightings 1-3 (1=little used, 3=preferably used);

specifying the type of design, erg. with a weighting of 1-3, wherein 1=hard (large regions of good vision, hard transitions), and 3 = soft (small regions of good vision, soft transitions);

selecting a length of progression: short, medium, long.

As a further feature of the design, the magnitude and site of maximum image defect, for example the total or surface astigmatism, may be specified.

However, it is not possible to achieve every desired design of a spectacle lens. For geometrical and physical reasons, certain subsidiary conditions must be observed. Thus, for a given addition power the progression corridor of a progressive lens cannot be broadened to any desired extent. The Minkwitz Proposition provides an indication of the width, and with it, of the position of those control points which are located in the close vicinity of the progression corridor. The tool will avoid contradictions and disagreements such as, for example, too wide a progression corridor or too small a maximum astigmatism, by means of suitable internal interrogation routines.

Furthermore, it is expedient to design a right-hand and a left-hand spectacle lens at the same time. By doing this, an ophthalmologist can for the first time deal also with problems of habit, for example, the holding of a head in an inclined position owing to an infirmity, and can configure the regions of good sight to be symmetrical even for atypical head-holding positions, or he can also respond to asymmetries of the binocular system, such as for example, different convergence behavior or different accommodative ability of a right and a left eye. In addition, a leading eye (right or left eye) and/or any marked dominance of a leading eye can be recorded and taken into account in designing and fabricating a lens.

In special cases, in particular, different shapes may be chosen for a principal meridian or a principal line (which coincides with a principal viewing axis). With this it is possible to give different shapes to a gradient of optical power increase and/or a nasal displacement of the principal line.

A specification of a spectacles wearer's further individual parameters such as, for example, the quality of binocular sight and/or $visus_{cc}$ may be made as follows, for example:

| | |
|---|---|
| Acuity of Vision (Visus$_{cc}$) | 1, 2 |
| Binocular vision | 3 |

0 = non-existent
1 = existent
3 = very good

When an ophthalmologist is satisfied with an individual design which he has developed on a display unit, he will send the control data, for example by remote transmission, to a manufacturer of the spectacle lens who will optimize the lens on a suitable computer according to his specifications. In the process of optimization a field of sagittal height is so conformed that the spectacle lens will satisfy th stipulations as far as possible in a wearing position. For this, the input design parameters are first examined for plausibility and practicability, and then, if appropriate, a weighting function is specified, the parameters of which will ensure the requirements of optical power at the reference points.

In case the result of optimization differs considerably from the stipulations made by the ordering ophthalmologist, this is reported back to the ophthalmologist as soon as possible (within a few seconds). He can then decide whether to accept the result as it is, or whether to change his stipulations.

Subsequently an optimization is made of a spectacle lens (pair of spectacle lenses) according to the received stipulations by means of numerical methods known in prior art, and the optimization result is examined for an achievement of the stipulated design.

Following this, the result of optimization may even be examined for any infringement of known patents.

The examined optimization result is transmitted back in the form of plots of the imaging properties.

If necessary, an iteration is made until the surface optimized by computation is of the desired design, or else the desired design is modified. Finally, the pair of spectacle lenses is fabricated and ground into a frame.

Thus the ophthalmologist may—either interactively or by first attempt—create designs by himself.

This extensive consultation will enhance the competence of an ophthalmologist for a customer. The ophthalmologist can gain a reputation of being a problem solver for difficult and unusual cases, and he is in possession of a tool with which to impress interested and knowledgeable customers.

The ophthalmologist is able to take seriously the desires and needs of a customer and to put these directly into practice. The individual consultation will convey to the customer the feeling of being "well looked after". Furthermore, the ophthalmologist is able to allow a customer to "experience" the creation, and with it the individuality, of his spectacles.

By making visible the development of a pair of spectacles (or lenses thereof), the competence of an ophthalmologist will become apparent to the customer, so that a purchase of spectacles becomes a real experience.

Taken altogether, the procedure in accordance with the invention will strengthen a link to a customer and enable an ophthalmologist to stand out amongst his competitors.

The invention claimed is:

1. Method for designing and optimizing an individual spectacle lens, said method comprising the acts of:
   making a draft design at an ophthalmologist's site on a video workstation by means of a computer program;
   communicating the draft design to a manufacturer or an optical computing office; and
   optimizing an individual spectacle lens on the basis of the communicated draft design, wherein making the draft design comprises:
   (a) defining a type of spectacle lens;
   (b) establishing an object distance as a function of a horizontal and a vertical coordinate;
   (c) optionally establishing an accommodation;
   (d) selecting regions of good vision from a set of given designs, or setting up regions of good vision by adjusting a shape of borderlines which separate zones of good vision from zones of poor vision; and
   (e) determining a location and a magnitude of a maximum imaging error or a minimum visus.

2. Method according to claim 1, wherein making of the draft design further comprises:
   (f) performing the steps (c) to (e) of making the design draft for a left eye and a right eye;
   (g) specifying further individual parameters of a spectacles wearer; and
   (h) optionally establishing which is a leading eye.

3. Method according to claim 1, wherein establishing an object distance comprises establishing an object distance for distance vision and near vision at defined reference points;
   establishing an accommodation comprises establishing a maximum accommodation;
   selecting regions of good vision comprises selecting regions of good vision by:
      establishing and suitably weighting mainly used regions;
      specifying a type of design; and
      selecting a progression length;
   step (d) of making the design draft is performed for a left eye and a right eye; and
   further individual parameters of a spectacles wearer are specified.

4. Method according to claim 1, wherein establishing an accommodation comprises establishing an accommodation as a function of an object distance;
   selecting regions of good vision comprises setting up regions of good vision by adjusting a shape of borderlines which separate zones of good vision from zones of poor vision;
   steps (c) to (e) are performed for a left eye and a right eye;
   further individual parameters of a spectacles wearer are specified; and
   which eye is a leading eye is optionally established.

5. Method according to claim 4, wherein design parameters are sent to a manufacturer or an optical computation office by remote transmission.

6. Method according to claim 5, wherein an optimization of a spectacle lens is performed by a manufacturer thereof or by an optical computation office according to design stipulations of an ophthalmologist in the following partial steps:
   (a) examining received design parameters for plausibility and practicability;
   (b) specifying weighting function, parameters of which ensure power requirements at reference points;
   (c) optimizing a spectacle lens or a pair of spectacle lenses according to received specifications by means of numerical methods;
   (d) examining a result of a performed optimization for an achievement of a stipulated design;
   (e) transmitting back the optimization result in form of plots of imaging properties;
   (f) iterating until a surface optimized by computation has a desired design, or changing the desired design; and (g) fabricating the pair of spectacle lenses and grinding them into a frame.

7. Method according to claim 2, wherein design parameters are sent to a manufacturer or an optical computation office by remote transmission.

8. Method according to claim 1, wherein design parameters are sent to a manufacturer or an optical computation office by remote transmission.

9. Method according to claim 4, wherein an optimization of a spectacle lens is performed by a manufacturer thereof or by an optical computation office according to design stipulations of an ophthalmologist in the following partial steps:
   (a) examining received design parameters for plausibility and practicability;
   (b) specifying a weighting function, parameters of which ensure power requirements at reference points;
   (c) optimizing a spectacle lens or a pair of spectacle lenses according to received specifications by means of numerical methods;
   (d) examining a result of a performed optimization for an achievement of a stipulated design;
   (e) transmitting back the optimization result in form of plots of imaging properties;
   (f) iterating until a surface optimized by computation has a desired design, or changing the desired design; and
   (g) fabricating the pair of spectacle lenses and grinding them into a frame.

10. Method according to claim 2, wherein an optimization of a spectacle lens is performed by a manufacturer thereof or by an optical computation office according to design stipulations of an ophthalmologist in the following partial steps:
    (a) examining received design parameters for plausibility and practicability;
    (b) specifying a weighting function, parameters of which ensure power requirements at reference points;
    (c) optimizing a spectacle lens or a pair of spectacle lenses according to received specifications by means of numerical methods;
    (d) examining a result of a performed optimization for an achievement of a stipulated design;
    (e) transmitting back the optimization result in form of plots of imaging properties;
    (f) iterating until a surface optimized by computation has a desired design, or changing the desired design; and
    (g) fabricating the pair of spectacle lenses and grinding them into a frame.

11. Method according to claim 1, wherein an optimization of a spectacle lens is performed by a manufacturer thereof or by an optical computation office according to design stipulations of an ophthalmologist in the following partial steps:
    (a) examining received design parameters for plausibility and practicability;
    (b) specifying a weighting function, parameters of which ensure power requirements at reference points;
    (c) optimizing a spectacle lens or a pair of spectacle lenses according to received specifications by means of numerical methods;
    (d) examining a result of a performed optimization for an achievement of a stipulated design;
    (e) transmitting back the optimization result in form of plots of imaging properties;
    (f) iterating until a surface optimized by computation has a desired design, or changing the desired design; and
    (g) fabricating the pair of spectacle lenses and grinding them into a frame.

12. Method according to claim 2, wherein steps (c) to (e) are performed by copying.

13. Method according to claim 3, wherein step (d) is performed by copying.

14. Method according to claim 4, wherein step (d) is performed by copying.

* * * * *